Dec. 5, 1961 D. F. KELLER 3,011,827
MEANS FOR DUMPING LOW BED SEMI-TRAILER TRUCKS
Filed April 21, 1960 2 Sheets-Sheet 1

INVENTOR
DANIEL FRANLIN KELLER

BY Robert L. Gunn,
ATTORNEY

Dec. 5, 1961  D. F. KELLER  3,011,827
MEANS FOR DUMPING LOW BED SEMI-TRAILER TRUCKS
Filed April 21, 1960  2 Sheets-Sheet 2

INVENTOR
DANIEL FRANKLIN KELLER
BY Robert L. Gunn
ATTORNEY.

United States Patent Office 3,011,827
Patented Dec. 5, 1961

3,011,827
MEANS FOR DUMPING LOW BED
SEMI-TRAILER TRUCKS
Daniel Franklin Keller, 691 17th Ave.,
Menlo Park, Calif.
Filed Apr. 21, 1960, Ser. No. 23,744
1 Claim. (Cl. 298—20)

This invention relates to trucks and deals with a means for dumping low bed semi-trailer trucks.

The low bed semi-trailer truck comprises a motor truck having a turntable for attaching the motor truck to a low bed semi-trailer body. The low bed body is considerably lower than the body of the motor truck and consequently the attachment to the motor truck at the forward end of the low body is higher than the floor of the low bed. My invention provides means for dumping truck bodies of this type.

The principal object of the invention to be hereinafter described and claimed is the provision of means whereby the front end of a low bed semi-trailer truck may be initially raised, and the low bed subsequently drawn forward to be supported on arms attached to the motor truck. The rear end of the low bed truck being supported on traveling wheels will follow in toward the motor truck and the whole bed will assume an inclined position, the angle of which will depend on how far the rear wheels are drawn in toward the motor truck. The only additions I would make to a conventional low bed semi-trailer truck are the arms for supporting the front end of the body above the floor of the motor truck, and the cable running down and under the front end of the semi-trailer body for drawing it toward the motor truck to be supported on the arms.

Other objects and advantages will become apparent as the description proceeds in connection with the drawings, in which.

Figure 1:
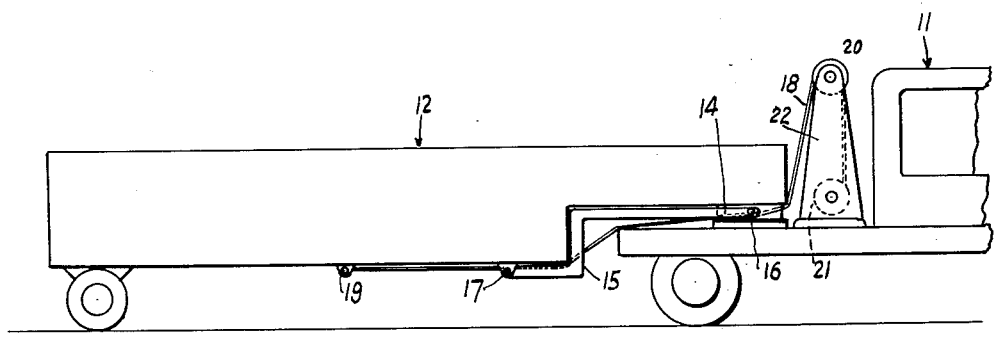
FIG. 1 is a side view of a low bed trailer of the type contemplated in this invention, with the trailer bed in a lowered position.
Figure 2:
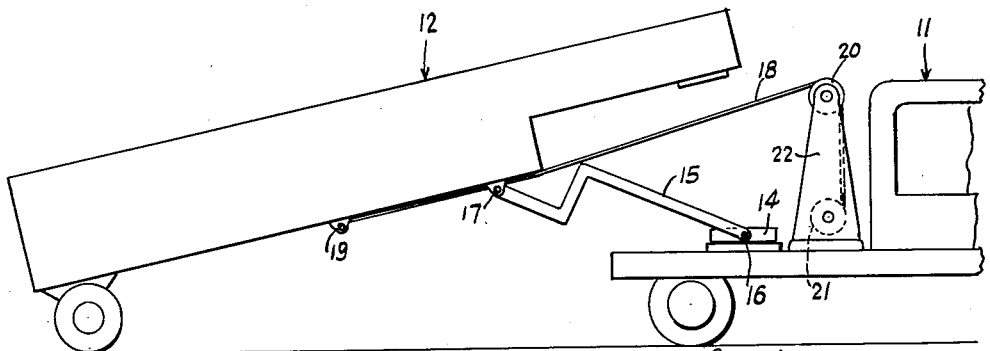
FIG. 2 is a view of the same with the bed in a half raised position.
Figure 3:
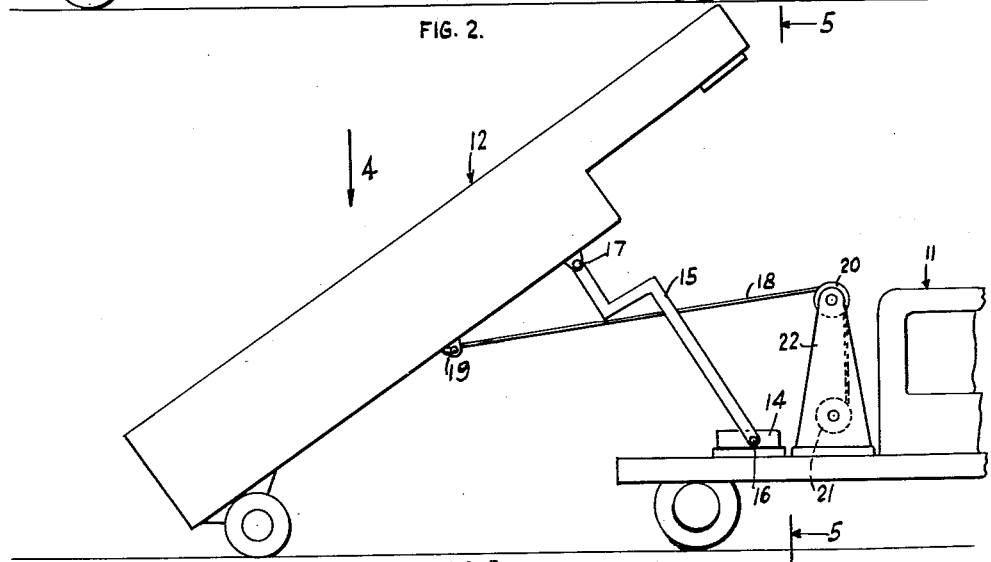
FIG. 3 is a view of the low bed trailer as it would appear in a full unloading position.
Figure 4:
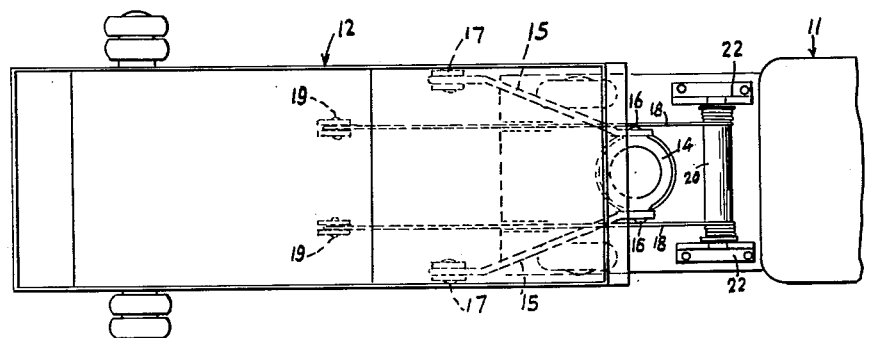
FIG. 4 is a top view of FIG. 3.
Figure 5:
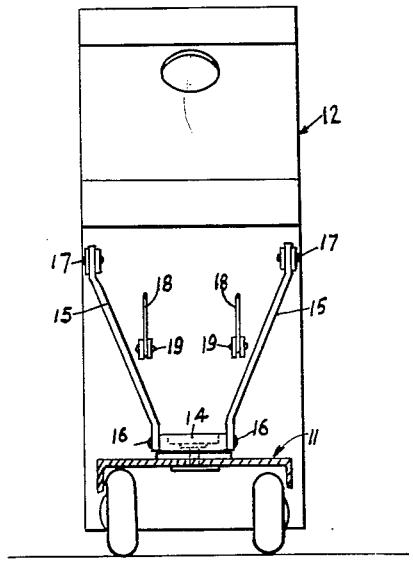
FIG. 5 is a cross sectional view of FIG. 3 taken in the direction of the arrow 5.

Referring to the drawing and particularly to FIGS. 1, 2 and 3, it will be seen that I have shown three positions of the low bed with respect to the motor truck. In these views, the motor truck is generally indicated by numeral 11 and the low bed semi-trailer by 12.

In the conventional low bed semi-trailer truck, the low bed is attached to the motor truck by a turntable shown and designated 14 mounted on the rear end of the motor truck 11. No detail of such connection is shown here because it is no part of this invention. However, I pivotally mount a pair of arms 15 on the turntable 14 as shown at 16 and pivotally connect the outer ends of these arms to the semi-trailer 12 as shown at 17. A single arm may be used, if desirable, but I prefer to use two arms, one on either side to provide a stable means for raising the front end of the trailer. As the trailer swings with respect to the truck, the arms being pivoted on the turntable will follow and always be in position for raising the front end of the trailer bed regardless of the relative positions of the motor truck and trailer.

The means for giving the front end of the trailer an initial upward pull resides in the arrangement of the cable that pulls the trailer in toward the truck. I have shown this arrangement as comprising a pair of cables 18. A single cable will serve the purpose but to get around the turntable 14 without introducing bends in the cable, I prefer to use a pair of cables, one on each side of the turntable. As shown, the outer ends of the cable are pivotally attached to the semi-trailer at 19 while the cable passes over an elevated roller 20 and is connected to a winch 21 driven by power from the truck motor not shown or by any other suitable power. The roller 20 and the winch 21 may be supported on any suitable means such as a frame 22 mounted on the rear end of the motor truck.

To unload, the operation starts from the position shown in FIG. 1. Here it will be noted the point 17 on the low bed is considerably below the point 16 on the turntable 14. Since the arms 15 extend from 17 to 16 on the turntable, this means that the forward end of the trailer must be raised before any inward movement of the trailer can be had.

To accomplish this initial lift, it will be observed, the cable 18 passes downwardly from roller 20 and under the front end of the trailer body, best seen in FIG. 1. Therefore, any pull exerted on the cable can only serve to raise the front end of the trailer until point 17 is above point 16 and the load is carried on the arms 15, shown in FIG. 2. At this point, the arms 15 take over and support the front end of the trailer and any more pull on the cable will draw the rear end of the trailer forward thereby pushing the front still higher, as shown in FIG. 3. This would be the dumping position. By releasing the cable, the trailer automatically settles into loading position after it has been dumped.

Although I have shown the cables 18 as passing over the elevated roller 20 to give the necessary angle to the initial upward pull on the front end of the semi-trailer body, the winch 21 may be placed at such an elevated position if desired and achieve the same results.

I claim:

Means for dumping a low bed semi-trailer truck having a motor truck with a turntable on the rear end thereof and a low bed semi-trailer unit, said means comprising arms pivotally connected at opposite ends to said turntable and to said semi-trailer unit respectively, with the point of connection of said arms to said trailer unit being normally below the point of connection of said arms to said turntable, a winch on said motor truck, a roller on said motor truck above said turntable, a cable connecting said winch to said trailer unit, said cable passing under the forward end of said trailer unit and over said roller to exert an initial upward pull to raise the forward end of said trailer unit and pull the same forward with respect to said truck to support the forward end thereof on said arms with the bed of said trailer unit in an inclined position.

References Cited in the file of this patent

UNITED STATES PATENTS 2,605,134    Clement et al.          July 29, 1952
2,710,224    Horvath              June 7, 1955